United States Patent [19]

Neu

[11] Patent Number: 5,947,526
[45] Date of Patent: Sep. 7, 1999

[54] PERSONAL FINANCIAL TRACKING SYSTEM AND METHOD

[75] Inventor: Roger L. Neu, Kirkwood, Mo.

[73] Assignee: Budget Master, LLC

[21] Appl. No.: 08/839,699

[22] Filed: Apr. 15, 1997

[51] Int. Cl.$^6$ .................................................. B42D 15/00
[52] U.S. Cl. ........................ 283/66.1; 283/48.1; 283/115; 705/500
[58] Field of Search ............................. 283/58, 44, 64.1, 283/66.1, 115, 117, 48.1, 900; 705/500

[56] References Cited

U.S. PATENT DOCUMENTS

| | | | |
|---|---|---|---|
| 409,223 | 8/1889 | McMillan | 283/48.1 |
| 591,319 | 10/1897 | Baker | 283/48.1 |
| 1,260,963 | 3/1918 | Burnham | 283/58 |
| 1,596,201 | 8/1926 | Marsh | 283/66.1 |
| 1,604,476 | 10/1926 | O'Brien | 283/66.1 |

Primary Examiner—Allen R. MacDonald
Assistant Examiner—Michele Stuckey Crecca
Attorney, Agent, or Firm—Larry K. Roberts

[57] ABSTRACT

A system, method and device for selectively tracking expenditures against a total monetary amount. The device includes a support having a plurality of response areas for presenting information for selection, and printing indicative of one or more discrete monetary amounts, each amount a small fraction of the total monetary amount as a discrete budget unit. The printing is fixed to the support within each response area. The plurality of response areas and the printing are arranged on the support in a distributed fashion such that the aggregate of the representations of the discrete monetary amounts equals the total monetary amount. The arrangement of the printing and response areas provides a visual representation of the total monetary amount as a distribution of discrete monetary amounts. Expenditure amounts are tracked by canceling, for each expenditure amount, a corresponding amount of the discrete printed representations to approximate the expenditure amount. The number of non-canceled representations provides a visual indication of the amount of funds remaining for expenditure, and the number of canceled representations provides a visual indication of the amount of funds expended.

12 Claims, 9 Drawing Sheets

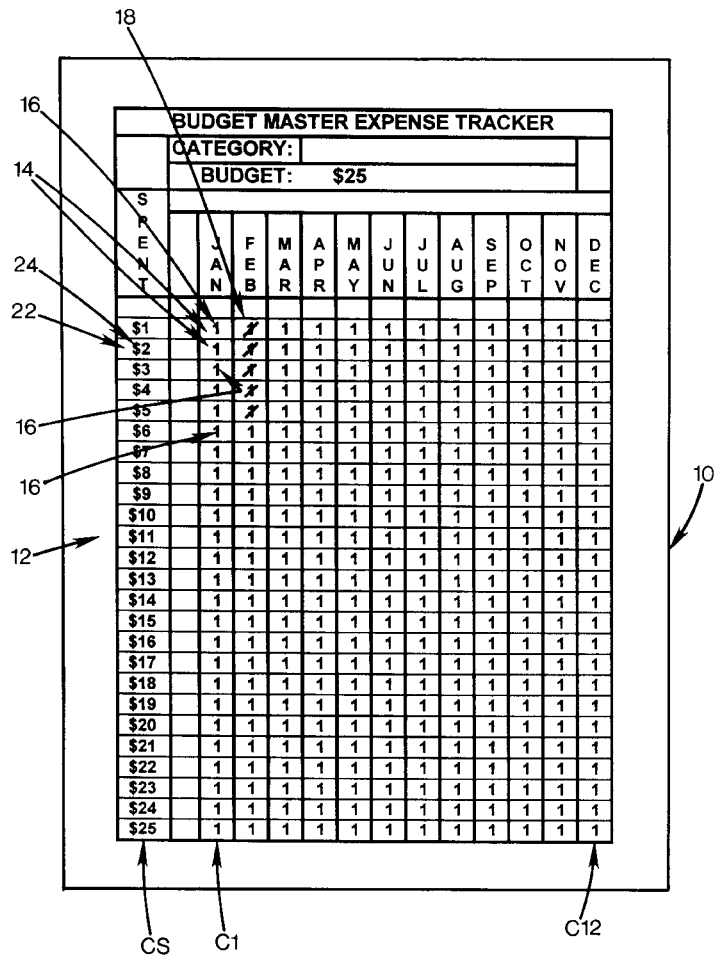

BUDGET MASTER EXPENSE TRACKER

CATEGORY:

BUDGET: $25

| SPENT | JAN | FEB | MAR | APR | MAY | JUN | JUL | AUG | SEP | OCT | NOV | DEC |
|---|---|---|---|---|---|---|---|---|---|---|---|---|
| $1 | 1 | ✗ | 1 | 1 | 1 | 1 | 1 | 1 | 1 | 1 | 1 | 1 |
| $2 | 1 | ✗ | 1 | 1 | 1 | 1 | 1 | 1 | 1 | 1 | 1 | 1 |
| $3 | 1 | ✗ | 1 | 1 | 1 | 1 | 1 | 1 | 1 | 1 | 1 | 1 |
| $4 | 1 | ✗ | 1 | 1 | 1 | 1 | 1 | 1 | 1 | 1 | 1 | 1 |
| $5 | 1 | ✗ | 1 | 1 | 1 | 1 | 1 | 1 | 1 | 1 | 1 | 1 |
| $6 | 1 | 1 | 1 | 1 | 1 | 1 | 1 | 1 | 1 | 1 | 1 | 1 |
| $7 | 1 | 1 | 1 | 1 | 1 | 1 | 1 | 1 | 1 | 1 | 1 | 1 |
| $8 | 1 | 1 | 1 | 1 | 1 | 1 | 1 | 1 | 1 | 1 | 1 | 1 |
| $9 | 1 | 1 | 1 | 1 | 1 | 1 | 1 | 1 | 1 | 1 | 1 | 1 |
| $10 | 1 | 1 | 1 | 1 | 1 | 1 | 1 | 1 | 1 | 1 | 1 | 1 |
| $11 | 1 | 1 | 1 | 1 | 1 | 1 | 1 | 1 | 1 | 1 | 1 | 1 |
| $12 | 1 | 1 | 1 | 1 | 1 | 1 | 1 | 1 | 1 | 1 | 1 | 1 |
| $13 | 1 | 1 | 1 | 1 | 1 | 1 | 1 | 1 | 1 | 1 | 1 | 1 |
| $14 | 1 | 1 | 1 | 1 | 1 | 1 | 1 | 1 | 1 | 1 | 1 | 1 |
| $15 | 1 | 1 | 1 | 1 | 1 | 1 | 1 | 1 | 1 | 1 | 1 | 1 |
| $16 | 1 | 1 | 1 | 1 | 1 | 1 | 1 | 1 | 1 | 1 | 1 | 1 |
| $17 | 1 | 1 | 1 | 1 | 1 | 1 | 1 | 1 | 1 | 1 | 1 | 1 |
| $18 | 1 | 1 | 1 | 1 | 1 | 1 | 1 | 1 | 1 | 1 | 1 | 1 |
| $19 | 1 | 1 | 1 | 1 | 1 | 1 | 1 | 1 | 1 | 1 | 1 | 1 |
| $20 | 1 | 1 | 1 | 1 | 1 | 1 | 1 | 1 | 1 | 1 | 1 | 1 |
| $21 | 1 | 1 | 1 | 1 | 1 | 1 | 1 | 1 | 1 | 1 | 1 | 1 |
| $22 | 1 | 1 | 1 | 1 | 1 | 1 | 1 | 1 | 1 | 1 | 1 | 1 |
| $23 | 1 | 1 | 1 | 1 | 1 | 1 | 1 | 1 | 1 | 1 | 1 | 1 |
| $24 | 1 | 1 | 1 | 1 | 1 | 1 | 1 | 1 | 1 | 1 | 1 | 1 |
| $25 | 1 | 1 | 1 | 1 | 1 | 1 | 1 | 1 | 1 | 1 | 1 | 1 |

FIG. 1

| | $1 | $2 | $3 | $4 | $5 |
|---|---|---|---|---|---|
| | \multicolumn{5}{c}{SAVING $ 50 FOR} | | | | |

| | $1 | $2 | $3 | $4 | $5 |
|---|---|---|---|---|---|
| $50 | $1 | $1 | $1 | $1 | $1 |
| $45 | $1 | $1 | $1 | $1 | $1 |
| $40 | $1 | $1 | $1 | $1 | $1 |
| $35 | $1 | $1 | $1 | $1 | $1 |
| $30 | $1 | $1 | $1 | $1 | $1 |
| $25 | $1 | $1 | $1 | $1 | $1 |
| $20 | $1 | $1 | $1 | $1 | $1 |
| $15 | $1 | $1 | $1 | $1 | $1 |
| $10 | $1 | $1 | $1 | $1 | $1 |
| $5 | $1 | $1 | $1 | $1 | $1 |
| | $1 | $2 | $3 | $4 | $5 |

FIG. 2

|  |  | BUDGETS (1 to 2 CHILDREN) | | | | | | | |
| --- | --- | --- | --- | --- | --- | --- | --- | --- | --- |
|  | Category | $1,500 | $2,000 | $2,500 | $3,000 | $3,500 | $4,000 | $4,500 | $5,000 |
|  | Auto - Fuel | $50 | $60 | $80 | $100 | $120 | $120 | $120 | $120 |
|  | Auto - Maintenance | $20 | $20 | $40 | $60 | $80 | $80 | $80 | $80 |
|  | Beauty | $20 | $20 | $20 | $40 | $40 | $40 | $40 | $40 |
|  | Charity | $60 | $100 | $120 | $140 | $160 | $180 | $200 | $220 |
|  | Cleaners | $0 | $0 | $20 | $20 | $20 | $20 | $20 | $20 |
|  | Clothes - Children | $40 | $40 | $40 | $40 | $0 | $60 | $80 | $80 |
|  | Clothes - Wife | $20 | $20 | $20 | $40 | $100 | $80 | $80 | $100 |
|  | Clothes - Husband | $20 | $20 | $20 | $20 | $60 | $40 | $40 | $80 |
|  | Decorating | $0 | $0 | $20 | $20 | $40 | $40 | $60 | $80 |
|  | Dining Out | $40 | $80 | $100 | $140 | $200 | $180 | $180 | $220 |
|  | Gifts - Family | $20 | $20 | $20 | $20 | $20 | $20 | $20 | $20 |
|  | Gifts - Other | $20 | $20 | $20 | $20 | $30 | $30 | $40 | $40 |
|  | Groceries | $300 | $320 | $380 | $400 | $380 | $550 | $550 | $600 |
|  | House Help | $0 | $0 | $0 | $0 | $0 | $0 | $0 | $0 |
|  | House Maintenance | $40 | $40 | $60 | $80 | $100 | $120 | $140 | $140 |
|  | Household Supplies | $20 | $30 | $30 | $60 | $60 | $70 | $70 | $80 |
|  | Lessons | $0 | $0 | $40 | $40 | $0 | $60 | $70 | $70 |
|  | Medical | $20 | $30 | $30 | $40 | $40 | $60 | $60 | $60 |
|  | Miscellaneous | $20 | $40 | $20 | $20 | $30 | $40 | $50 | $50 |
|  | Pets | $0 | $0 | $0 | $20 | $0 | $20 | $20 | $20 |
|  | Recreation - General | $30 | $60 | $80 | $80 | $100 | $100 | $120 | $120 |
|  | Rec. - Weekend Trips | $0 | $0 | $20 | $40 | $40 | $40 | $40 | $40 |
|  | Total Weekly Exp. | $740 | $920 | $1,180 | $1,440 | $1,620 | $1,950 | $2,080 | $2,280 |
| Variable | Gardner | $0 | $0 | $0 | $0 | $0 | $0 | $0 | $0 |
|  | Savings | $20 | $100 | $120 | $160 | $180 | $200 | $200 | $260 |
|  | Utilities - Electric | $80 | $80 | $100 | $100 | $120 | $120 | $160 | $180 |
|  | Utilities - Gas | $20 | $20 | $20 | $20 | $20 | $30 | $40 | $40 |
|  | Utilities - Telephone | $50 | $60 | $60 | $80 | $80 | $80 | $80 | $80 |
|  | Utilities - Water | $20 | $20 | $20 | $20 | $20 | $20 | $20 | $20 |
|  | Reserve - Mandatory | $20 | $20 | $20 | $30 | $40 | $40 | $80 | $80 |
|  | Reserve - Optional |  | $20 | $20 | $20 |  | $30 | $50 | $50 |
|  | Total Variable Exp. | $210 | $320 | $360 | $430 | $460 | $520 | $630 | $710 |
| Periodic | Auto - Insurance | $60 | $80 | $100 | $100 | $100 | $120 | $140 | $140 |
|  | Auto Lic. & Reg. | $30 | $40 | $40 | $40 | $60 | $60 | $60 | $60 |
|  | Property Tax | $0 | $0 | $50 | $50 | $100 | $100 | $200 | $200 |
|  | Recreation - Vacation | $20 | $50 | $70 | $80 | $80 | $80 | $100 | $100 |
|  | Holiday Gifts | $0 | $0 | $0 | $0 | $10 | $20 | $20 | $20 |
|  | Total Periodic Exp. | $110 | $170 | $260 | $270 | $350 | $380 | $520 | $520 |
| Fixed | Auto - Payment | $100 | $140 | $140 | $140 | $200 | $180 | $200 | $220 |
|  | Insurance - Disability | $0 | $0 | $0 | $0 | $0 | $0 | $0 | $0 |
|  | Insurance - Health | $0 | $0 | $0 | $0 | $0 | $0 | $0 | $0 |
|  | Insurance - House | $20 | $20 | $20 | $20 | $20 | $20 | $20 | $20 |
|  | Insurance - Life | $20 | $20 | $30 | $40 | $40 | $40 | $40 | $40 |
|  | Insurance - Property | $0 | $10 | $10 | $10 | $10 | $10 | $10 | $10 |
|  | Mort/Rent | $300 | $400 | $500 | $650 | $800 | $900 | $1,000 | $1,200 |
|  | School Tuition | $0 | $0 | $0 | $0 | $0 | $0 | $0 | $0 |
|  | Total Fixed Expenses | $440 | $590 | $700 | $860 | $1,070 | $1,150 | $1,270 | $1,490 |
|  | TOTAL EXPENSES | $1,500 | $2,000 | $2,500 | $3,000 | $3,500 | $4,000 | $4,500 | $5,000 |

FIG. 3

| Year | CATEGORY | | | | | | | |
|---|---|---|---|---|---|---|---|---|
| | MONTHLY BUDGET | | $400 | | | | | |

| Odd Amounts | | Day of Month | January | February | March | April | May | June | Remain. | Spent |
|---|---|---|---|---|---|---|---|---|---|---|
| 22222 | 1 1 1 1 1 | 1 | 5 5 5 | 5 5 5 | 5 5 5 | 5 5 5 | 5 5 5 | 5 5 5 | $400 | $15 |
| 22222 | 1 1 1 1 1 | 2 | 5 5 5 | 5 5 5 | 5 5 5 | 5 5 5 | 5 5 5 | 5 5 5 | $385 | $30 |
| 22222 | 1 1 1 1 1 | 3 | 5 5 | 5 5 | 5 5 | 5 5 | 5 5 | 5 5 | $370 | $40 |
| 22222 | 1 1 1 1 1 | 4 | 5 5 5 | 5 5 5 | 5 5 5 | 5 5 5 | 5 5 5 | 5 5 5 | $360 | $55 |
| 22222 | 1 1 1 1 1 | 5 | 5 5 5 | 5 5 5 | 5 5 5 | 5 5 5 | 5 5 5 | 5 5 5 | $345 | $70 |
| 22222 | 1 1 1 1 1 | 6 | 5 5 | 5 5 | 5 5 | 5 5 | 5 5 | 5 5 | $330 | $80 |
| 22222 | 1 1 1 1 1 | 7 | 5 5 5 | 5 5 5 | 5 5 5 | 5 5 5 | 5 5 5 | 5 5 5 | $320 | $95 |
| 22222 | 1 1 1 1 1 | 8 | 5 5 5 | 5 5 5 | 5 5 5 | 5 5 5 | 5 5 5 | 5 5 5 | $305 | $110 |
| 22222 | 1 1 1 1 1 | 9 | 5 5 | 5 5 | 5 5 | 5 5 | 5 5 | 5 5 | $290 | $120 |
| 22222 | 1 1 1 1 1 | 10 | 5 5 5 | 5 5 5 | 5 5 5 | 5 5 5 | 5 5 5 | 5 5 5 | $280 | $135 |
| 22222 | 1 1 1 1 1 | 11 | 5 5 5 | 5 5 5 | 5 5 5 | 5 5 5 | 5 5 5 | 5 5 5 | $265 | $150 |
| 22222 | 1 1 1 1 1 | 12 | 5 5 | 5 5 | 5 5 | 5 5 | 5 5 | 5 5 | $250 | $160 |
| 22222 | 1 1 1 1 1 | 13 | 5 5 5 | 5 5 5 | 5 5 5 | 5 5 5 | 5 5 5 | 5 5 5 | $240 | $175 |
| 22222 | 1 1 1 1 1 | 14 | 5 5 5 | 5 5 5 | 5 5 5 | 5 5 5 | 5 5 5 | 5 5 5 | $225 | $190 |
| 22222 | 1 1 1 1 1 | 15 | 5 5 | 5 5 | 5 5 | 5 5 | 5 5 | 5 5 | $210 | $200 |
| 22222 | 1 1 1 1 1 | 16 | 5 5 5 | 5 5 5 | 5 5 5 | 5 5 5 | 5 5 5 | 5 5 5 | $200 | $215 |
| 22222 | 1 1 1 1 1 | 17 | 5 5 5 | 5 5 5 | 5 5 5 | 5 5 5 | 5 5 5 | 5 5 5 | $185 | $230 |
| 22222 | 1 1 1 1 1 | 18 | 5 5 | 5 5 | 5 5 | 5 5 | 5 5 | 5 5 | $170 | $240 |
| 22222 | 1 1 1 1 1 | 19 | 5 5 5 | 5 5 5 | 5 5 5 | 5 5 5 | 5 5 5 | 5 5 5 | $160 | $255 |
| 22222 | 1 1 1 1 1 | 20 | 5 5 5 | 5 5 5 | 5 5 5 | 5 5 5 | 5 5 5 | 5 5 5 | $145 | $270 |
| 22222 | 1 1 1 1 1 | 21 | 5 5 | 5 5 | 5 5 | 5 5 | 5 5 | 5 5 | $130 | $280 |
| 22222 | 1 1 1 1 1 | 22 | 5 5 5 | 5 5 5 | 5 5 5 | 5 5 5 | 5 5 5 | 5 5 5 | $120 | $295 |
| 22222 | 1 1 1 1 1 | 23 | 5 5 5 | 5 5 5 | 5 5 5 | 5 5 5 | 5 5 5 | 5 5 5 | $105 | $310 |
| 22222 | 1 1 1 1 1 | 24 | 5 5 | 5 5 | 5 5 | 5 5 | 5 5 | 5 5 | $90 | $320 |
| 22222 | 1 1 1 1 1 | 25 | 5 5 5 | 5 5 5 | 5 5 5 | 5 5 5 | 5 5 5 | 5 5 5 | $80 | $335 |
| 22222 | 1 1 1 1 1 | 26 | 5 5 5 | 5 5 5 | 5 5 5 | 5 5 5 | 5 5 5 | 5 5 5 | $65 | $350 |
| 22222 | 1 1 1 1 1 | 27 | 5 5 | 5 5 | 5 5 | 5 5 | 5 5 | 5 5 | $50 | $360 |
| 22222 | 1 1 1 1 1 | 28 | 5 5 5 | 5 5 5 | 5 5 5 | 5 5 5 | 5 5 5 | 5 5 5 | $40 | $375 |
| 22222 | 1 1 1 1 1 | 29 | 5 5 5 | 5 5 5 | 5 5 5 | 5 5 5 | 5 5 5 | 5 5 5 | $25 | $390 |
| 22222 | 1 1 1 1 1 | 30 | 5 5 | 5 5 | 5 5 | 5 5 | 5 5 | 5 5 | $10 | $400 |
| | | | | | | | | | | |
| Over/(Under) Total (1) | | | | | | | | | | |
| Over/(Under) for the Month (2) | | | | | | | | | | |
| | | Budget | $400 | $400 | $400 | $400 | $400 | $400 | | |
| Total Monthly Expense (3) | | | | | | | | | | |

(1) Over = Total of dollar units checked off in next month.
(Under) = Total of dollar units remaining in the current budget month.
(2) Subtract the "Over/(Under) Total" in the prior month from the "Over/(Under) Total" for the current month. Example: If line 1 in Feb. is ($20) and line 1 in March is $10, line 2 for March would equal $30 ($10 - ($20)). [Note: When subtracting a negative change the sign to a plus]
(3) The sum of line (2) and the Budget amount.

FIG. 4A

| Odd Amounts | Day of Month | July | August | Sept. | October | Nov. | Dec. | Remain. | Spent |
|---|---|---|---|---|---|---|---|---|---|
| | | Year | | CATEGORY | | | | | |
| | | | | MONTHLY BUDGET | $400 | | | | |
| 22222 | 1 1 1 1 1 | 1 | 5 5 5 | 5 5 5 | 5 5 5 | 5 5 5 | 5 5 5 | 5 5 5 | $400 | $15 |
| 22222 | 1 1 1 1 1 | 2 | 5 5 5 | 5 5 5 | 5 5 5 | 5 5 5 | 5 5 5 | 5 5 5 | $385 | $30 |
| 22222 | 1 1 1 1 1 | 3 | 5 5 | 5 5 | 5 5 | 5 5 | 5 5 | 5 5 | $370 | $40 |
| 22222 | 1 1 1 1 1 | 4 | 5 5 5 | 5 5 5 | 5 5 5 | 5 5 5 | 5 5 5 | 5 5 5 | $360 | $55 |
| 22222 | 1 1 1 1 1 | 5 | 5 5 5 | 5 5 5 | 5 5 5 | 5 5 5 | 5 5 5 | 5 5 5 | $345 | $70 |
| 22222 | 1 1 1 1 1 | 6 | 5 5 | 5 5 | 5 5 | 5 5 | 5 5 | 5 5 | $330 | $80 |
| 22222 | 1 1 1 1 1 | 7 | 5 5 5 | 5 5 5 | 5 5 5 | 5 5 5 | 5 5 5 | 5 5 5 | $320 | $95 |
| 22222 | 1 1 1 1 1 | 8 | 5 5 5 | 5 5 5 | 5 5 5 | 5 5 5 | 5 5 5 | 5 5 5 | $305 | $110 |
| 22222 | 1 1 1 1 1 | 9 | 5 5 | 5 5 | 5 5 | 5 5 | 5 5 | 5 5 | $290 | $120 |
| 22222 | 1 1 1 1 1 | 10 | 5 5 5 | 5 5 5 | 5 5 5 | 5 5 5 | 5 5 5 | 5 5 5 | $280 | $135 |
| 22222 | 1 1 1 1 1 | 11 | 5 5 5 | 5 5 5 | 5 5 5 | 5 5 5 | 5 5 5 | 5 5 5 | $265 | $150 |
| 22222 | 1 1 1 1 1 | 12 | 5 5 | 5 5 | 5 5 | 5 5 | 5 5 | 5 5 | $250 | $160 |
| 22222 | 1 1 1 1 1 | 13 | 5 5 5 | 5 5 5 | 5 5 5 | 5 5 5 | 5 5 5 | 5 5 5 | $240 | $175 |
| 22222 | 1 1 1 1 1 | 14 | 5 5 5 | 5 5 5 | 5 5 5 | 5 5 5 | 5 5 5 | 5 5 5 | $225 | $190 |
| 22222 | 1 1 1 1 1 | 15 | 5 5 | 5 5 | 5 5 | 5 5 | 5 5 | 5 5 | $210 | $200 |
| 22222 | 1 1 1 1 1 | 16 | 5 5 5 | 5 5 5 | 5 5 5 | 5 5 5 | 5 5 5 | 5 5 5 | $200 | $215 |
| 22222 | 1 1 1 1 1 | 17 | 5 5 5 | 5 5 5 | 5 5 5 | 5 5 5 | 5 5 5 | 5 5 5 | $185 | $230 |
| 22222 | 1 1 1 1 1 | 18 | 5 5 | 5 5 | 5 5 | 5 5 | 5 5 | 5 5 | $170 | $240 |
| 22222 | 1 1 1 1 1 | 19 | 5 5 5 | 5 5 5 | 5 5 5 | 5 5 5 | 5 5 5 | 5 5 5 | $160 | $255 |
| 22222 | 1 1 1 1 1 | 20 | 5 5 5 | 5 5 5 | 5 5 5 | 5 5 5 | 5 5 5 | 5 5 5 | $145 | $270 |
| 22222 | 1 1 1 1 1 | 21 | 5 5 | 5 5 | 5 5 | 5 5 | 5 5 | 5 5 | $130 | $280 |
| 22222 | 1 1 1 1 1 | 22 | 5 5 5 | 5 5 5 | 5 5 5 | 5 5 5 | 5 5 5 | 5 5 5 | $120 | $295 |
| 22222 | 1 1 1 1 1 | 23 | 5 5 5 | 5 5 5 | 5 5 5 | 5 5 5 | 5 5 5 | 5 5 5 | $105 | $310 |
| 22222 | 1 1 1 1 1 | 24 | 5 5 | 5 5 | 5 5 | 5 5 | 5 5 | 5 5 | $90 | $320 |
| 22222 | 1 1 1 1 1 | 25 | 5 5 5 | 5 5 5 | 5 5 5 | 5 5 5 | 5 5 5 | 5 5 5 | $80 | $335 |
| 22222 | 1 1 1 1 1 | 26 | 5 5 5 | 5 5 5 | 5 5 5 | 5 5 5 | 5 5 5 | 5 5 5 | $65 | $350 |
| 22222 | 1 1 1 1 1 | 27 | 5 5 | 5 5 | 5 5 | 5 5 | 5 5 | 5 5 | $50 | $360 |
| 22222 | 1 1 1 1 1 | 28 | 5 5 5 | 5 5 5 | 5 5 5 | 5 5 5 | 5 5 5 | 5 5 5 | $40 | $375 |
| 22222 | 1 1 1 1 1 | 29 | 5 5 5 | 5 5 5 | 5 5 5 | 5 5 5 | 5 5 5 | 5 5 5 | $25 | $390 |
| 22222 | 1 1 1 1 1 | 30 | 5 5 | 5 5 | 5 5 | 5 5 | 5 5 | 5 5 | $10 | $400 |
| | | | | | | | | | | |
| Over/(Under) Total (1) | | | | | | | | | | |
| Over/(Under) for the Month (2) | | | | | | | | | | |
| | Budget | $400 | $400 | $400 | $400 | $400 | $400 | | |
| Total Monthly Expense (3) | | | | | | | | | |

(1) Over = Total of dollar units checked off in next month.
(Under) = Total of dollar units remaining in the current budget month.
(2) Subtract the "Over/(Under) Total" in the prior month and the "Over/(Under) Total" for the current month. Example: If line 1 in Feb. is ($20) and line 1 in March is $10, line 2 for March would equal $30 ($10 - ($20)). [Note: When subtracting a negative change the sign to a plus]
(3) The sum of line 2 and the Budget amount.

FIG. 4B

MONTHLY "VARIABLE" EXPENSES

Year

| Month | Utilities - Electricity | | $ | | Utilities - Gas | | $ | | Utilities - Telephone | | $ |
|---|---|---|---|---|---|---|---|---|---|---|---|
| | Actual | Over (Under) | Cumul. O or (U) | | Actual | Over (Under) | Cumul. O or (U) | | Actual | Over (Under) | Cumul. O or (U) |
| January | | | | | | | | | | | |
| February | | | | | | | | | | | |
| March | | | | | | | | | | | |
| April | | | | | | | | | | | |
| May | | | | | | | | | | | |
| June | | | | | | | | | | | |
| July | | | | | | | | | | | |
| August | | | | | | | | | | | |
| September | | | | | | | | | | | |
| October | | | | | | | | | | | |
| November | | | | | | | | | | | |
| December | | | | | | | | | | | |

| Month | Utilities - Water | | $ | | | | $ | | | | $ |
|---|---|---|---|---|---|---|---|---|---|---|---|
| | Actual | Over (Under) | Cumul. O or (U) | | Actual | Over (Under) | Cumul. O or (U) | | Actual | Over (Under) | Cumul. O or (U) |
| January | | | | | | | | | | | |
| February | | | | | | | | | | | |
| March | | | | | | | | | | | |
| April | | | | | | | | | | | |
| May | | | | | | | | | | | |
| June | | | | | | | | | | | |
| July | | | | | | | | | | | |
| August | | | | | | | | | | | |
| September | | | | | | | | | | | |
| October | | | | | | | | | | | |
| November | | | | | | | | | | | |
| December | | | | | | | | | | | |

| Month | | | $ | | | | $ | | | | $ |
|---|---|---|---|---|---|---|---|---|---|---|---|
| | Actual | Over (Under) | Cumul. O or (U) | | Actual | Over (Under) | Cumul. O or (U) | | Actual | Over (Under) | Cumul. O or (U) |
| January | | | | | | | | | | | |
| February | | | | | | | | | | | |
| March | | | | | | | | | | | |
| April | | | | | | | | | | | |
| May | | | | | | | | | | | |
| June | | | | | | | | | | | |
| July | | | | | | | | | | | |
| August | | | | | | | | | | | |
| September | | | | | | | | | | | |
| October | | | | | | | | | | | |
| November | | | | | | | | | | | |
| December | | | | | | | | | | | |

FIG. 5

| SUMMARY - OVER/(UNDER) |||||||||
|---|---|---|---|---|---|---|---|
| (Page 1 of 2) |||||||||
| Year | | | | | | | | |
| Budget | Weekly- Variable | January | Feb. | March | April | May | June |
| | Auto - Fuel | | | | | | |
| | Auto - Maintenance | | | | | | |
| | Beauty | | | | | | |
| | Charity | | | | | | |
| | Cleaners | | | | | | |
| | Clothes - Children | | | | | | |
| | Clothes - Wife | | | | | | |
| | Clothes - Husband | | | | | | |
| | Decorating | | | | | | |
| | Dining Out | | | | | | |
| | Gifts - Family | | | | | | |
| | Gifts - Other | | | | | | |
| | Groceries | | | | | | |
| | House Help | | | | | | |
| | House Maintenance | | | | | | |
| | Household Supplies | | | | | | |
| | Lessons | | | | | | |
| | Medical | | | | | | |
| | Miscellaneous | | | | | | |
| | Pets | | | | | | |
| | Recreation - General | | | | | | |
| | Rec. - Weekend Trips | | | | | | |
| | | | | | | | |
| + | Over/(Under) > | | | | | | |
| Budget | Periodic Expenses | | | | | | |
| | Auto - Insurance | | | | | | |
| | Auto - License & Reg. | | | | | | |
| | Holiday Gifts | | | | | | |
| | Property Tax | | | | | | |
| | Summer Camps | | | | | | |
| | Vacation | | | | | | |
| | Reserve - Optional | | | | | | |
| | Reserve - Mandatory | | | | | | |
| | | | | | | | |
| + | Savings for Per. Exp. > | | | | | | |

FIG. 6A

| | SUMMARY - OVER/(UNDER) | | | | | | |
|---|---|---|---|---|---|---|---|
| | (Page 2 of 2) | | | | | | |
| Year | | | | | | | |
| | | | | | | | |
| Budget | Monthly - Variable | January | February | March | April | May | June |
| | Gardner | | | | | | |
| | Savings | | | | | | |
| | Utilities - Electric | | | | | | |
| | Utilities - Gas | | | | | | |
| | Utilities - Telephone | | | | | | |
| | Utilities - Water | | | | | | |
| | | | | | | | |
| | | | | | | | |
| | | | | | | | |
| | | | | | | | |
| | Mo. Over/(Under) > | | | | | | |
| | Weekly Over/(Under) (p.1) > | | | | | | |
| | Total Over/(Under) for Mo.> | | | | | | |
| | + Monthly Budget | | | | | | |
| | Total Monthly Expenses | | | | | | |
| | Cumulative Over/(Under) | | | | | | |
| | | | | | | | |
| Budget | Monthly Fixed Expenses | | | | | | |
| | Auto - Payment | | | | | | |
| | Auto - License & Reg. | | | | | | |
| | Insurance - Auto | | | | | | |
| | Insurance - Disability | | | | | | |
| | Insurance - Health | | | | | | |
| | Insurance - House | | | | | | |
| | Insurance - Life | | | | | | |
| | Insurance - Property | | | | | | |
| | Mort/Rent & Prop Tax | | | | | | |
| | School Tuition | | | | | | |
| | | | | | | | |
| | | | | | | | |
| | | | | | | | |
| | | | | | | | |
| + | < Total Fixed Expenses | | | | | | |
| + | < Total Mo. Variable Exp. | | | | | | |
| + | < Total Weekly Exp. (p.1) | | | | | | |
| + | < Total Periodic Exp. (p.1) | | | | | | |
| | | | | | | | |
| = | < Monthy Budget (add "Weekly," "Periodic," "Monthly" and "Fixed" expense amounts) | | | | | | |

FIG. 6B

| Budget | CUMULATIVE SUMMARY | | | | | | |
|---|---|---|---|---|---|---|---|
| | | Year | | | | | |
| | Weekly - Variable | Jan | Feb | March | April | May | June |
| | Auto - Fuel | | | | | | |
| | Auto - Maintenance | | | | | | |
| | Beauty | | | | | | |
| | Charity | | | | | | |
| | Cleaners | | | | | | |
| | Clothes - Children | | | | | | |
| | Clothes - Wife | | | | | | |
| | Clothes - Husband | | | | | | |
| | Decorating | | | | | | |
| | Dining Out | | | | | | |
| | Gifts - Family | | | | | | |
| | Gifts - Other | | | | | | |
| | Groceries | | | | | | |
| | House Help | | | | | | |
| | House Maintenance | | | | | | |
| | Household Supplies | | | | | | |
| | Lessons | | | | | | |
| | Medical | | | | | | |
| | Miscellaneous | | | | | | |
| | Pets | | | | | | |
| | Recreation - General | | | | | | |
| | Rec. - Weekend Trips | | | | | | |
| | School Supplies | | | | | | |
| | | | | | | | |
| | Cum. Weekly Over/(Under) > | | | | | | |
| | | | | | | | |
| | Monthly - Variable | | | | | | |
| | Gardner | | | | | | |
| | Savings | | | | | | |
| | Utilities - Electric | | | | | | |
| | Utilities - Gas | | | | | | |
| | Utilities - Telephone | | | | | | |
| | Utilities - Water | | | | | | |
| | | | | | | | |
| | Cum. Mo. Over/(Under) > | | | | | | |
| | + Cum. Weekly Over/(Under) > | | | | | | |
| | = Cum Over/(Under) to Date | | | | | | |

FIG. 7

PERSONAL FINANCIAL TRACKING SYSTEM AND METHOD

TECHNICAL FIELD OF THE INVENTION

This invention relates to systems for tracking items susceptible to numeric measurement, and more particularly to a personal financial tracking system and method.

BACKGROUND OF THE INVENTION

A particular application for which this invention is well suited is that of monitoring expenses by persons who are not accounting professionals.

Many individuals and households have the need and desire to achieve some measure of control over their fiscal affairs. It can be quite difficult to achieve financial goals without having a measure of expenditures.

The task of manually keeping track of expenses is a daunting one for many people, since it requires organizational as well as mathematical skills. This has led, with the advent of the personal computer, toward computer programs for home accounting.

There are a myriad of computerized systems now available for keeping accounts and books. Some are adapted for use on personal computers for maintaining checking account balances, and include expense categories to which particular expenses, when so designated, will be assigned. Problems associated with these computerized systems include the need to learn how to use the system as well as the computer on which the system is to run, and the fact that the user must have access to the computer to update the records. Another problem with such computerized systems is the absence of a pictorial presentation showing how much money has been spent or is remaining in relation to a particular length of time that has expired or is still remaining, i.e. how much money and how much month is left. For many people, the time and effort needed to learn a new system outweighs the perceived benefit of tracking personal expenses and accounts, and it is difficult to maintain such a system over an extended time period.

There is therefor a need for a simplified technique for tracking expenses, which is not computationally intensive, presents real time information that is easy to understand and analyze, and which does not require expertise in accounting principles.

SUMMARY OF THE INVENTION

In accordance with one aspect of the invention, a device is described for selectively tracking expenditures against a total monetary amount. The device includes a support having a plurality of response areas for presenting information for selection, and printing indicative of one or more discrete monetary amounts, each amount a small fraction of the total monetary amount as a discrete budget unit. The printing is fixed to the support within each response area. The plurality of response areas and the printing are arranged on the support in a distributed fashion such that the aggregate of the representations of the discrete monetary amounts equals the total monetary amount. The arrangement of the printing and response areas provides a visual representation of the total monetary amount as a distribution of discrete monetary amounts. Expenditure amounts are tracked by canceling, for each expenditure amount, a corresponding amount of the discrete printed representations to approximate the expenditure amount. The number of non-canceled representations provides a visual indication of the amount of funds remaining for expenditure, and the number of canceled representations provides a visual indication of the amount of funds expended. The representations are evenly distributed over an area allocated to a particular time period, e.g. a month, to allow for a visual comparison of the canceled representations in relation to the time period.

In accordance with another aspect of the invention, a method is described for tracking monetary expenditures, comprising:

- determining a budgeted total monetary amount for a predetermined time interval;
- fixing one or more discrete monetary amounts, each of which is a small fraction of the budgeted total monetary amount as a discrete budget unit;
- arranging a plurality of representations of the one or more discrete monetary amounts in a distributed fashion on a medium such that the aggregate of the representations equals the budgeted total monetary amount, wherein the arrangement of the representations provides a visual representation of the budgeted total monetary amount as a distribution of discrete monetary amounts; and
- tracking a plurality of expenditure amounts by canceling, for each expenditure amount, a corresponding amount of the representations to approximate the expenditure amount, wherein the number of non-canceled representations provides a visual indication of the amount of funds remaining for expenditure, and the number of canceled representations provides a visual indication of the amount of funds expended.

The device and method can also be used to track amounts which have been saved.

BRIEF DESCRIPTION OF THE DRAWING

These and other features and advantages of the present invention will become more apparent from the following detailed description of an exemplary embodiment thereof, as illustrated in the accompanying drawings, in which:

FIG. 1 illustrates an exemplary device in accordance with an aspect of the invention for tracking expenses.

FIG. 2 illustrates an exemplary device in accordance with the invention for tracking savings.

FIG. 3 is an exemplary sample budget useful for helping to establish a personal budget.

FIGS. 4A and 4B illustrate an exemplary monthly expense device in accordance with the invention.

FIG. 5 illustrates an exemplary monthly variable expense device in accordance with the invention.

FIGS. 6A and 6B illustrate an exemplary summary device for tracking budgets over- and under-spending.

FIG. 7 shows a cumulative summary device useful for summary tracking purposes.

DETAILED DESCRIPTION OF THE PREFERRED EMBODIMENT

Overview of the Invention

FIG. 1 illustrates one aspect of the invention, a device 10 for tracking expenditures against a preset budgeted total. The device includes a support 12 having a plurality of response areas 14 for presenting information for selection. In one embodiment, the support 12 is a sheet of paper. The device further includes printing 16 indicative of a discrete monetary amount, fixed to the support 12 within each response area 14. In this exemplary embodiment, the discrete amount is one 1 dollar, and the budgeted total is 25 dollars. The plurality of response areas 14 and the printing are arranged on the support in a distributed fashion such that the aggregate of the discrete amounts equals the total monetary amount. In particular, the response areas are arranged on the support in columnar form, wherein 25 response areas 14 and printing representations 16 are spaced along a column C1. It will be noted that, for this exemplary embodiment, there are twelve columns C1–C12, one column for each month of the year. Each column has a plurality of response areas, and printing representing the discrete monetary unit. While for simplicity the discrete unit is 1 dollar, for other embodiments other discrete monetary units may be used, such as $10, $20, $50 or 50 cents.

The device 10 is used in the following manner, to track expenses. Each column tracks expenses, for a given expense category, for a given time period. For example, column C1 is used to track expenses for the month of January. To track expenses, individual ones of the printing representations are canceled, starting from the top of the column, to indicate expenditures of a corresponding amount. Say for example the expense category is automobile expenses, and the user purchased $5.25 worth of gasoline for the automobile. To track this expense, a number of the 1 dollar printing representations, starting from the top of the column C1, would be canceled, e.g. by marking a line through five of the 1 dollar representations, highlighting with a colored marker, or some other technique for canceling the number of discrete monetary units which approximate the expenditure.

Canceling is illustrated for the month of February, by the interlineations 18 drawn through the top five discrete number representations. Other types of canceling could alternatively be employed by the user, such as punching through each number representation to be canceled.

Another feature of the device illustrated in FIG. 1 is the column CS, which has an area 22 corresponding to each response area in a given column C1–C12, and printing 24 associated with each area 22. The printing indicates a running total of the amount spent during a time period tracked by a given column. For the example just given, canceling 5 of the discrete units 16 will result in the first five units being canceled, and the area 22 on the same row adjacent the fifth unit canceled has therein the printed representation $5, indicated total aggregate expenditure for this category of $5 for the month of January to date. In essence, the amount spent column performs the calculation for the user of the aggregate amount of funds expended to date in a given month.

FIG. 2 illustrates a tracking device 30 in accordance with another aspect of the invention. The device 30 includes a support 32 having a plurality of response areas 34 for presenting information for selection. Printing 36 is indicative of discrete monetary unit in a distributed fashion over a matrix of rows and columns. In this exemplary case, the device 30 is used to track savings of increments of $1, toward a savings goal of $50. A column CS is disposed along one vertical edge of the matrix with printing representations of an aggregate total. A row RS is disposed along a lateral edge of the matrix, and includes printing representations of an total along a single row. Thus, to track savings using the device 30, as funds are accumulated, the user cancels the printing representations 36, commencing on the bottom row, proceeding from left to right. The saving row RS indicates the aggregate along a given row, while the saving column CS indicates the aggregate canceled for the preceding rows. The exemplary device 30 is set up to track progress toward a saving goal of $50.

Description of an Exemplary System

The following is a brief summary of how an exemplary implementation embodying the invention works. Each step is explained in greater detail following this summary.

(1) Establish a personalized budget for the expense categories selected. These budget amounts will be entered on the left side of the Summary pages. Sample budgets can be provided and used to assist in this; FIG. 3 illustrates one exemplary sample budget.

(2) Weekly expense devices are provided for budget items ranging from $20 to $1,500 per month. Each device has a unique number pattern designed to spread expenditures evenly throughout the month. Select the Weekly expense device with the amount that matches the budgeted amount for each weekly expense category. Fill in the category name and year at the top of each device. For example, if one budgets $400 for groceries, select the Weekly expense device (FIGS. 4A and 4B) that shows a $400 amount, title it Groceries and enter the appropriate year. In this exemplary embodiment, the front (FIG. 4A) of each Weekly budget device contains the months, January through June, and the back (FIG. 4B) contains the months of July through December.

(3) Use the Weekly expense devices to check off dollars as they are spent. As one checks off the amount of money spent, the system shows both visually and numerically how many days and how many dollars are left in the month, and how many dollars have been spent to date.

(4) The budgeted amounts for the Monthly Variable Expenses should be entered on the Monthly Variable Expense device (FIG. 5). These expenses are paid once a month, but vary in amount each month such as utility expenses. At the end of each month the actual variable expense amount should be entered and that amount can then be compared to the budgeted amount.

(5) Periodic Expenses are those expenses paid less frequently than once a month, such as vacation and property taxes. Periodic Expenses are accounted for like a savings account. If a payment is due in six months, divide the amount of the payment by six to arrive at the amount to be saved each month for that expense. Go to the bottom of page 1 of the "Summary" (FIGS. 6A and 6B) and insert the names of the Periodic expenses and the monthly budget amount for each expense. For each Periodic expense put the monthly budget amount in the first month and then each month after that add the monthly budget amount to the prior month cumulative total. If the monthly budget is $100, enter $100, $200, $300, $400 and $500 for months 1, 2, 3, 4 and 5 respectively. The result is that the savings amount builds up month-by-month to the amount required at the time of the expenditure. In the sixth month when the $600 expenditure is incurred, $0 is entered to show that the savings equaled the amount of the expense. If the expense is more than the savings to date, the difference has to be subtracted from the savings amounts for the next month(s). For example if the expense in the example above was $750 instead of $600, months 7 and 8 would reflect $0 and $50 to show that there is no money available in the 7th month and only $50 available in the 8th month.

(6) Record the over and under budget amounts for each Weekly and Monthly expense category in the Summary to show the total amount over or under budget for the month.

(7) Use the Cumulative Summary device (FIG. 7) to show on a year-to-date basis how much over or under budget for each expense category and for all expense categories as a total.

Detailed Instructions for this exemplary system are set out below.

Step 1: Creating a budget.

Understanding sample and actual budgets: The sample budgets (e.g., FIG. 3) are to be used only as guidelines for establishing one's own budget. The sample budgets are designed to give some idea of what a normal spending pattern might look like based on one's take home income. The actual monthly budget amounts will be entered on the left side of the Summary device (FIGS. 6A, 6B) for each expense category. The budgeted amounts for Weekly and Periodic expenses follow these rules:

1. No budget amounts of less than $20;
2. Budget amounts from $20 to $100 should use $10 intervals;
3. Budget amounts from $100 to $500 should use $20 intervals;
4. Budget amounts from $500 to $1,000 should use $50 intervals; and
5. Budget amounts from $1,000 to $1,500 should use $100 intervals.

For example, a grocery budget amount of $620 does not follow the rules. The proper budget amount should be either $600 or $650 which follows rule number 4.

There are four identified categories of expenses; (i) Weekly; (ii) Periodic; (iii) Monthly; and (iv) Fixed. Expenses have already been categorized on the Summary device. The following is a brief description of each of the four categories:

Weekly Expenses. Expenses that are incurred one or more times during the week or no less than two or three times each month such as groceries and recreation expenses.

Monthly Expenses. Expenses that are paid once a month but vary in amount each month such as utility bills.

Fixed Expenses. Expenses that do not vary from month-to-month. Fixed expenses only change after a period of months or years such as when a different car or house is purchased or new insurance policies are acquired.

Periodic Expenses. Expenses that are paid less frequently than once a month such as expenses for vacation, summer camps, property tax or insurance. Periodic Expenses are usually paid on a quarterly, semiannual or annual basis or some other irregular basis throughout the year.

Setting up the Budget:

The four steps below illustrate how to set up a personal budget.

(1) Review the Budgets and find the take home pay that most closely approximates the amount of money that one has available to spend each month.

(2) Using the Budget guideline selected, complete the personal budget by putting in personalized expense amounts for each category on the left side of the Summary device. Start with Fixed expenses then, in order, complete budgets for Monthly, Periodic and Weekly expenses.

(3) Enter subtotals for the Weekly, Periodic, Monthly and Fixed expenses.

(4) Add up the four subtotals to arrive at the total monthly budget amount.

Step 2: Expense Devices

Devices are provided from which to select to use to track the Weekly expenses. Each device has a specific budget amount with budgets ranging from $20 to $1,500. The selected devices should be set up as follows.

(1) Based on the amounts inserted in the personalized Budget, select the budget devices reflecting the amount of each Weekly expense category.

(2) List each Weekly expense category, in alphabetical order, on a "Weekly" expense table of contents page.

(3) Put the year and appropriate title on each budget device.

(4) There are certain Periodic expenses that one may want to track by using Weekly expense devices, such as vacation expenses. These expense categories should be included in the Weekly expense table of contents with the appropriate budget devices.

(5) The year, the name of the budget category and the budget amount for the category need to be filled in for each Monthly Variable Expense noted in the Budget.

Step 3: Tracking Monthly Expenses.

A. Weekly Expenses (1) As expenses are incurred throughout the week, go to each applicable Weekly expense budget device and mark off the value of the units representing the amount spent. If one is right on budget, there will always be as many rows of numbers left to check off as there are days left in the month. If one spends more than the budgeted amount for the month, one will need to begin checking off numbers in the next month. Since part of next month's dollars will already be checked off, one can see that one will have to spend less money in the next month to stay within budget.

The following exemplary fact pattern and expense device are presented for illustration purposes. If the Smiths have a $400 grocery budget, when they make their first grocery purchase of $30 they would check off six of the 5's. The system shows that there is $370 remaining for the month and that $30 has been spent. One can also see how many days are left in the month compared to how much money remains.

| Day of Month | January | Remaining | Spent |
|---|---|---|---|
| 1 | 5̸ 5̸ 5̸ | $400 | $15 |
| 2 | 5̸ 5̸ 5̸ | $385 | $30 |
| 3 | 5 5 | $370 | $40 |
| 4 | 5 5 5 | $360 | $55 |
| 5 | 5 5 5 | $345 | $70 |

(2) All expenditures must be accounted for. Use the receipt amounts to record the expenditures in the Weekly expense budget devices. Expenses should be recorded daily if possible, but in no event less than twice each week.

(3) Note that there are Odd Amounts on the left side of each of the Weekly expense devices. The Odd Amounts can be used along with the daily unit amounts to more precisely record expenditures. Whenever the dollars checked off in the Odd Amounts total a whole dollar unit amount in the monthly expense column then check off a unit amount in the monthly expense column.

(4) At the bottom of each Weekly expense device are rows that are designed to allow one to determine, for each expense category; (i) the amount over or under budget for the month; and (ii) the total amount spent for the month. Do not include cents and round numbers up or down to make it easier to perform most mathematical functions in one's head.

B. Monthly Variable Expenses

1) At the end of the month enter the amount spent for each Monthly Variable expense on the appropriate device.

(2) Subtract the actual amount from the budgeted amount and enter the difference in the Over/(Under) column. Then carry down the cumulative over or under amount in the Cum O/(U) column.

C. Periodic Expenses (1) Periodic expense variances are tracked separately from other variable expenses so that monthly budget variances can be more accurately recorded each month. There are typically several months in which a Periodic expense may not be incurred. If the over or under amount of these expenses was recorded each month along with the other expense variances, in most months one would appear to be under budget (except in the month in which the expense was actually incurred). Appearances, however, would be misleading because the Periodic expenses are always hiding around the corner of a future month.

(2) Budget devices for selected Periodic expenses, such as vacation expenses, can be used in the same way they are used for Weekly expenses. The one difference, however, will be that there will be months in which there will be no Periodic expenses to record. Wait until the expense is incurred and then check off numbers beginning with the first budget month. For example, if one has a vacation budget of $1,200 or $100 per month, if the budget starts January 1 and the first expenses are in June for $500, mark off all the numbers for January through May. Note that one will only need to have budget devices for those Periodic expenses that are not fixed in amount.

(3) The Summary has a special section on page 1 for "Periodic" expenses. At the end of each month, add the prorata amount needed to save for that month to the cumulative amount from the prior month in order to show the savings required at the time the expense is incurred. For example if the vacation budget is $1,200 and $750 is spent in the sixth month, months 1 through 5 would show required savings of $100, $200, $300, $400 and $500, respectively. In the sixth month, subtract $600 (the cumulative savings through the sixth month) from the actual expenditure of $750. Since actual expenditures were more than the cumulative six month savings, $0 should be entered for the sixth month. The excess of $150 should be subtracted from the seventh and eighth months which would show $0 and $50, respectively. No month should reflect a negative amount. If the actual expense is less than the cumulative monthly amount, the positive difference should be recorded in the month of the expenditure. For example, if expenses in the example in the sixth month are $450, the amount recorded in the sixth month would be $150 ($600–$450).

(4) Notice that there are two Reserve accounts under Periodic expenses. One is for optional reserve amounts and the other is for mandatory reserve amounts. There will be occasions when one will make extraordinary "weekly" expenses such as the acquisition of a pet or the purchase of a new appliance. The purpose for the Weekly expense devices is to account for expenses that are incurred on a normal ongoing basis throughout each month. When there is an extraordinary expense, those expenses should be offset against either the optional or mandatory reserve so that the "weekly" expenses won't be distorted.

D. Fixed Expenses

The only place that one will need to record and track Fixed expenses is in the Summary. Enter the same fixed amount for each month until there is an event causing the current fixed amount to change.

Step 4: The Summary

General Instructions:

(1) Obtain page 1 (FIG. 6A) of the Summary so that it is available to record the variance amounts from the Weekly budget devices.

(2) Record the over or (under) amount from each Weekly budget device in the Summary on the row of the applicable expense category under the current month column.

(3) In the middle of page 2 is a budget variance analysis section. Add the daily variance amounts from page 1 to the monthly variances to arrive at the "Total Over/(Under) for the month. Then; (i) fill in the monthly budget total in the next line; (ii) subtract the amount (Under) or add the amount Over in the line above; and (iii) record the result in the row titled Total Monthly Expenses. The Cumulative Over/(Under) amount can then be tracked by adding each current monthly total variance to the preceding month cumulative total.

Special Instructions for Periodic Expenses:

(1) See the instructions at Step 3C. Periodic expenses.

(2) Total the savings amount for all the Periodic expenses for the month to show the total savings required and the total amount available for all "Periodic" expenses at the end of each month.

Step 5: Cumulative Summary

At the end of the each month, record in the Cumulative Summary the Over/(Under) Total for the applicable month from each Weekly expense device. Also record the Cumul. O or (U) amount for each Monthly Variable Expense budget item for the applicable month. Total the amounts for each month to show the year-to-date cumulative over or under budget amount.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. A method for tracking monetary expenditures, comprising:

determining a budgeted total monetary amount for a predetermined time interval;

fixing one or more discrete monetary amounts, each of which is a small fraction of the budgeted total monetary amount as a discrete budget unit;

arranging a plurality of representations of the one or more discrete monetary amounts in a distributed fashion on a medium in a plurality of groups of representations, each group in turn corresponding to a given time sub-interval for the predetermined time interval, such that the aggregate of the representations equals the budgeted total monetary amount, wherein the arrangement of the representations provides a visual representation of the budgeted total monetary amount as a distribution of discrete monetary amounts;

tracking a plurality of expenditure amounts by canceling, for each expenditure amount, a corresponding amount of the representations to approximate the expenditure amount, wherein the number of non-canceled representations provides a visual indication of the amount of funds remaining for expenditure, and the number of canceled representations provides a visual indication of the amount of funds expended.

2. The method of claim 1 wherein the predetermined time interval is a one month time interval, and the time sub-interval is one day.

3. The method of claim 1 wherein the medium is a sheet of paper.

4. The method of claim 1 wherein said plurality of representations of the one or more discrete monetary amounts are spatially evenly distributed over an area corresponding to said time interval.

5. The method of claim 4 wherein said area is a column area on said medium, and said plurality of representations are evenly distributed in columnar form in said area.

6. The method of claim 1 wherein the representations of the discrete monetary amount are Arabic numbers.

7. A device for selectively tracking expenditures against a total monetary amount, comprising:

a support having a plurality of response areas for presenting information for selection, each response area corresponding to a given time sub-interval for a predetermined time interval;

printing indicative of one or more discrete monetary amounts, each amount a small fraction of the total monetary amount as a discrete budget unit, fixed to the support within each response area;

the plurality of response areas and the printing arranged on the support in a distributed fashion such that the aggregate of the representations of the discrete monetary amounts equals the total monetary amount;

wherein the arrangement of the printing and response areas provides a visual representation of the budgeted total monetary amount as a distribution of discrete monetary amounts, and wherein expenditure amounts are tracked by canceling, for each expenditure amount, a corresponding amount of the discrete printed representations to approximate the expenditure amount, wherein the number of non-canceled representations provides a visual indication of the amount of funds remaining for expenditure, and the number of canceled representations provides a visual indication of the amount of funds expended.

8. The device of claim 7 wherein the predetermined time interval is a one month time interval, and the time sub-interval is one day.

9. The device of claim 7 wherein the printing of the discrete monetary amount comprises Arabic numbers.

10. The device of claim 7 wherein the support is a sheet of paper.

11. The device of claim 7 wherein said plurality of representations of the one or more discrete monetary amounts are spatially evenly distributed over an area corresponding to said time interval.

12. The device of claim 11 wherein said area is a column area on said support, and said plurality of representations are evenly distributed in columnar form in said area.

* * * * *